July 6, 1965 C. N. SCHRADER, JR 3,192,862
BLADED ELEMENT FOR FLUID TORQUE CONVERTERS AND THE LIKE
Filed March 13, 1961 5 Sheets-Sheet 1
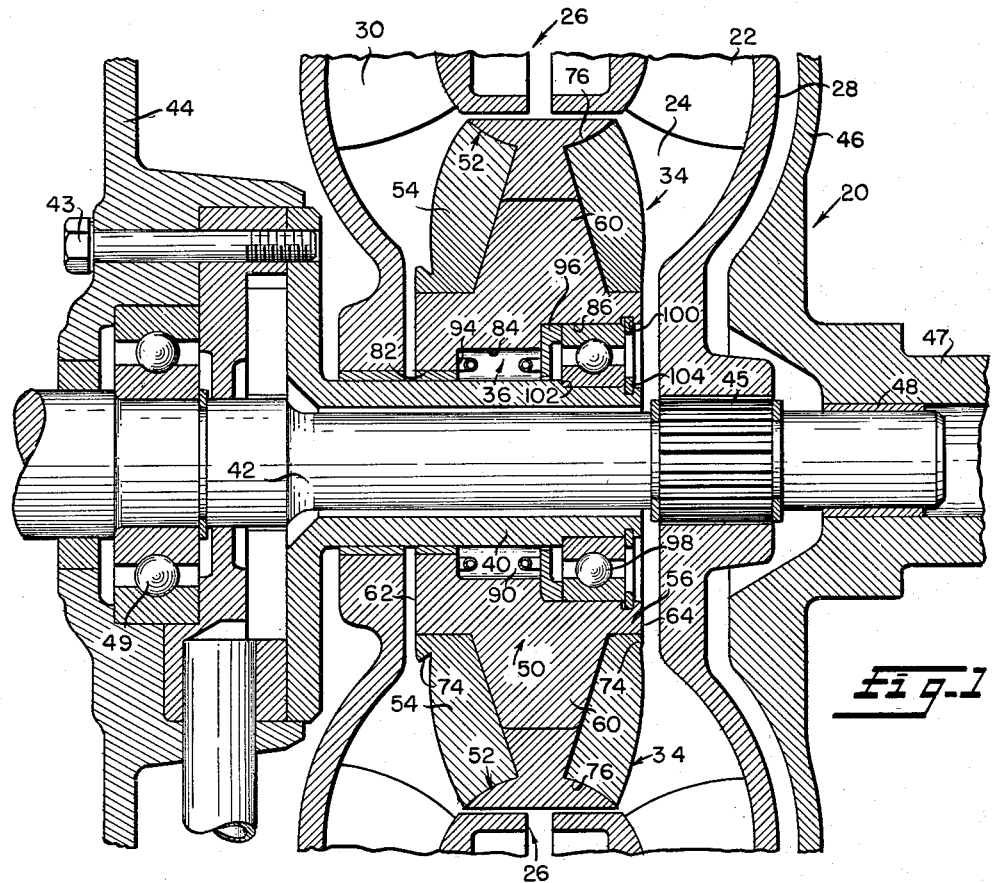
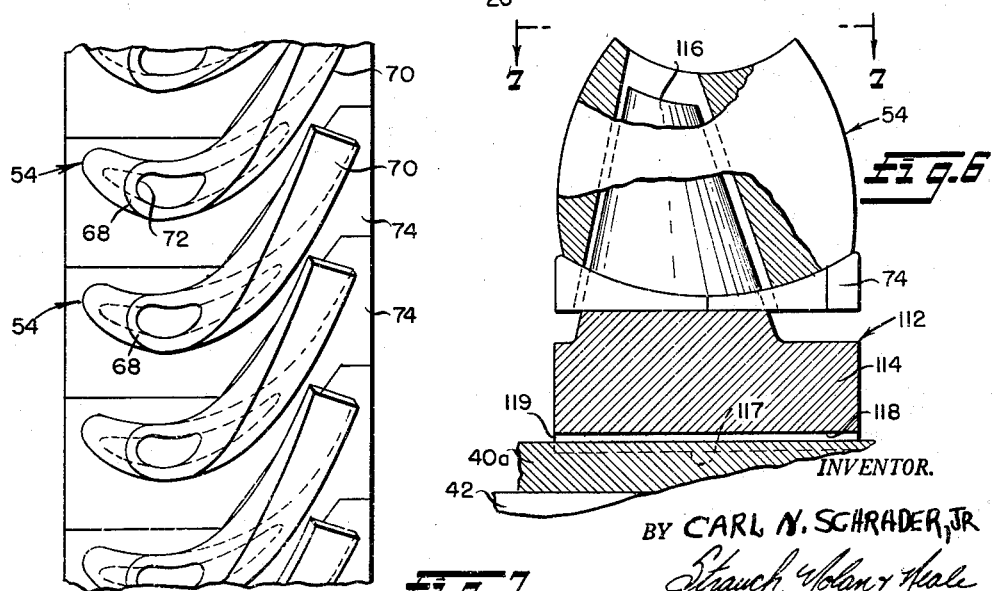
INVENTOR.
BY CARL N. SCHRADER, JR
ATTORNEYS July 6, 1965   C. N. SCHRADER, JR   3,192,862
BLADED ELEMENT FOR FLUID TORQUE CONVERTERS AND THE LIKE
Filed March 13, 1961   5 Sheets-Sheet 2
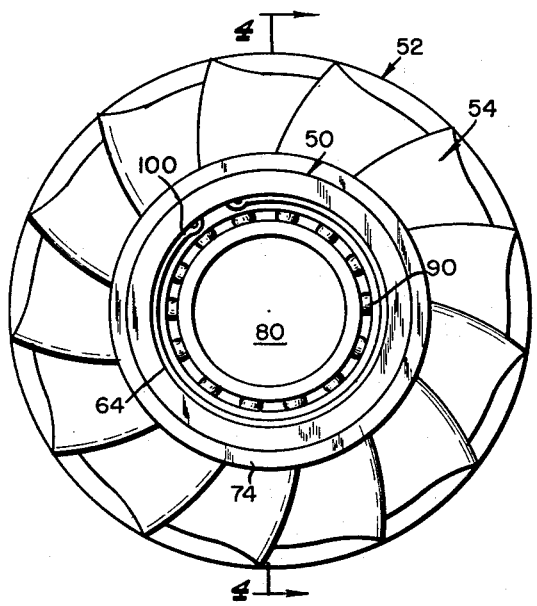
Fig. 3
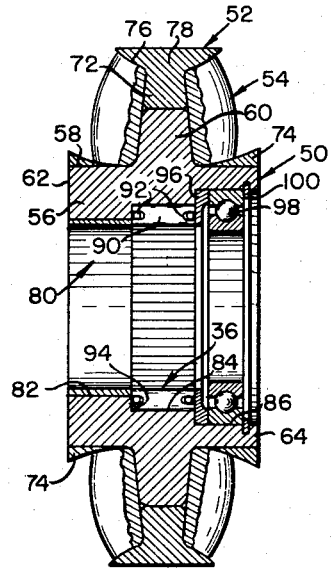
Fig. 4
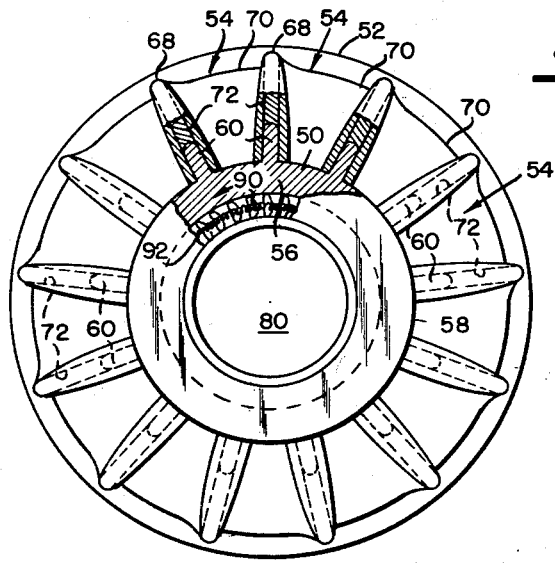
Fig. 2
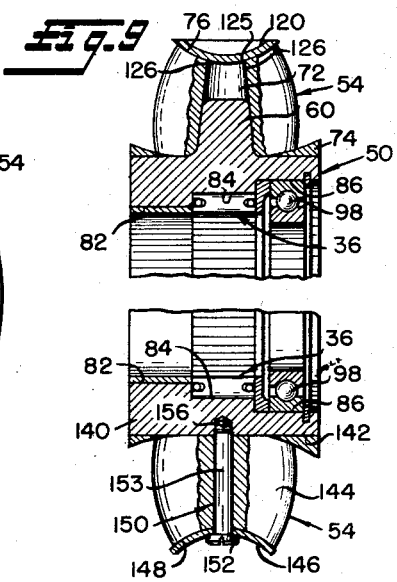
Fig. 9
Fig. 11
INVENTOR.
BY CARL N. SCHRADER, JR
ATTORNEYS July 6, 1965 C. N. SCHRADER, JR 3,192,862
BLADED ELEMENT FOR FLUID TORQUE CONVERTERS AND THE LIKE
Filed March 13, 1961 5 Sheets-Sheet 3

INVENTOR.
BY CARL N. SCHRADER, JR
Strauch, Nolan & Neale
ATTORNEYS

July 6, 1965 C. N. SCHRADER, JR 3,192,862
BLADED ELEMENT FOR FLUID TORQUE CONVERTERS AND THE LIKE
Filed March 13, 1961 5 Sheets-Sheet 4

INVENTOR
CARL N. SCHRADER, JR.
BY
ATTORNEYS

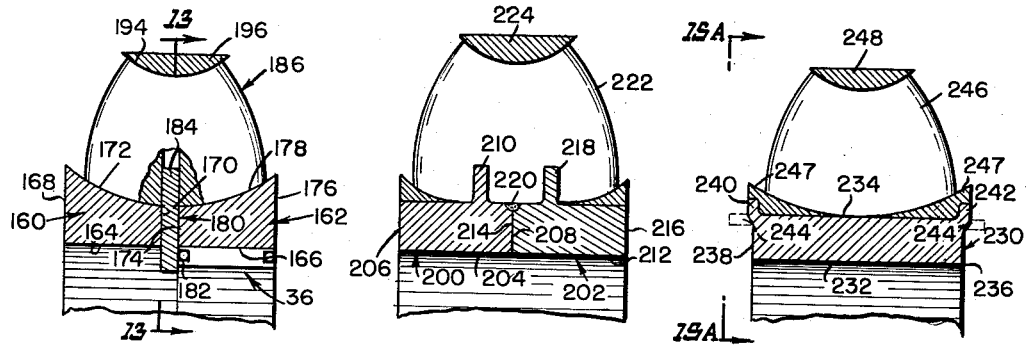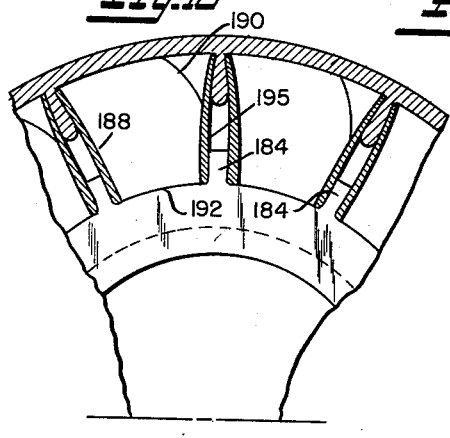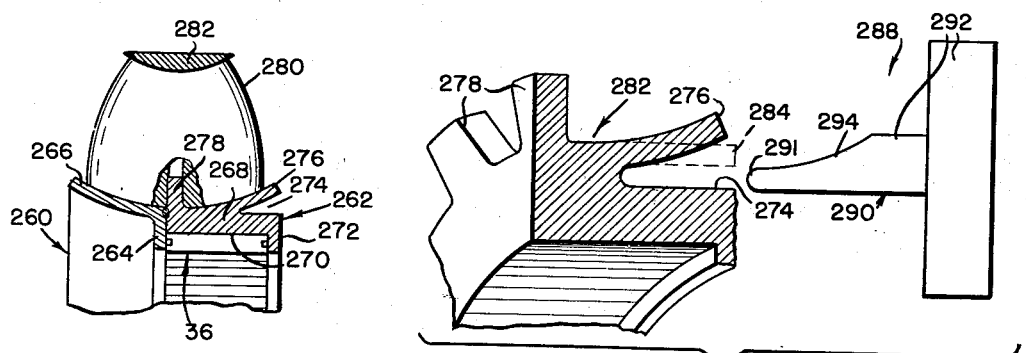

United States Patent Office 3,192,862
Patented July 6, 1965

3,192,862
BLADED ELEMENT FOR FLUID TORQUE CONVERTERS AND THE LIKE
Carl N. Schrader, Jr., Trenton, Mich., assignor, by mesne assignments, to Rockwell-Standard Corporation, a corporation of Delaware
Filed Mar. 13, 1961, Ser. No. 95,218
6 Claims. (Cl. 103—115)

The present invention relates to hydrodynamic fluid torque transmitting devices and more particularly to an improved construction of bladed reaction and stator members for torque converters and the like and to the method of manufacturing such members.

In conventional torque converters and similar hydrodynamic constructions, it is customary to provide a reaction member or stator mounted between an impeller and a turbine wheel for re-directing the circulating torque converter fluid from the turbine back to the impeller. The reaction member is conventionally effective to produce a desired torque multiplication to increase the torque exerted on the turbine or driven member of the torque converter.

In some constructions, the reaction member is mounted on an over-running or one-way clutch which functions to resist rotation of the reaction member in a direction opposite that of the turbine.

In the past, it has been the custom to mount the one-way clutch unit for a free-wheeling reaction member directly between the inner blade support shroud of the reaction member and a stationary shaft or support sleeve which mounts the reaction member. One of the shortcomings of such an arrangement is that there is only a relatively small limited space available to receive the clutch unit between the inner periphery of the reaction member and the support sleeve. As a consequence, difficulty has been encountered in providing for a one-way clutch which fits into this limited space between the inner periphery of the reaction member and the support sleeve and also which is large enough to provide for an equivalent or greater torque capacity than the maximum input torque rating for which the torque converter is constructed.

With conventional reaction member castings, and particularly with reaction members which are cast as one piece, the foregoing difficulties attributable to the limited space for mounting the clutch are intensified because it is necessary to provide for a separate properly hardened and machined outer race for the clutch unit sprags. The need for a separate outer race takes up space that would otherwise be available to enlarge the size of clutch sprags for increasing the capacity of the one-way clutch.

In reaction members which are cast as one piece by conventional casting methods, the hub of the reaction member is not utilizable as the outer race for the clutch sprags since the reaction member is too cumbersome to facilitate ready machining of the bore formed by the hub and more particularly since the member cannot be hardened by heat treatment without resulting in the possible distortion of the blades or in warping and cracking of the casting. To this end, it will be appreciated that the surfaces engaged by the clutch sprags must be hardened to resist the cutting action and abrasion caused by the sprags.

In some instances, the size of the clutch completely precludes it from being mounted in the available space between the reaction member and the support sleeve with the result that the clutch has to be mounted outside of and remote from the torque converter. This construction, however, has several attendant disadvantages such as higher construction costs and increased difficulties in assembling the component parts of the transmission assembly.

With the present invention, the reaction member is fabricated in a special manner to enable the bore formed by the inner shroud to be readily machined and hardened to thereby eliminate the necessity of employing a separate outer race for the clutch sprags. As a consequence, the available annular space between the inner shroud of the reaction member and the support sleeve is correspondingly increased to enable the convenient and economical mounting of a one-way clutch having increased capacity within the same size torque converter.

This is accomplished in accordance with the present invention by separately casting or forging the inner blade support shroud. Prior to assembly of the blades and the outer shroud, the bore formed by the hub of the inner shroud is machined for receiving the clutch sprags. The inner shroud usually is then hardened by standard heat treating methods to thereby condition the hub bore for use as a confining peripheral surface for the clutch sprags. After the inner shroud is hardened, separately formed blades are mounted on radially extending spokes formed integral with the hub of the inner shroud. The outer blade support shroud in the form of a continuous rim is thereafter attached by mechanical means such as lock rings or brazing or by means of casting a suitable material to form an integral interlocking unit with the blades. Also, the blades and outer rim may be cast simultaneously around the spoked inner shroud.

In some applications, it is desirable to extend the spokes of the hub all the way through the blades to allow attachment of the outer rim by brazing or welding or the spokes may be extended only part way through the blades to allow casting material of the outer rim to flow into the free space in the blades.

With the foregoing assembly of component parts, the reaction hub is readily machined and hardened to receive the clutch sprags before the blades are mounted in the assembly so as not to cause distortion of the blades during heat treatment, and the necessity of providing for a separate outer clutch sprag race is consequently eliminated.

With a bladed stator member fabricated according to the present invention, the necessity of employing separate splined or key-wayed hubs or sleeves also is eliminated. By casting or forging the inner shroud separately, the spoked hub of the stator may be readily machined and hardened to form the necessary splines or key-way for securing the stator against rotation. By this construction, the elimination of a separate splined sleeve or hub serves to reduce the cost of manufacture and simplifies the assembly of component parts to more readily adapt the production of the hydrodynamic device in which the stator is embodied to mass production methods.

By means of constructing the reaction member or stator in accordance with the present invention, it will be appreciated that due to the separately fabricated component parts of the assembly, a variety of materials may be used to form the individual component parts such as steel, aluminum, magnesium, and thermal plastic materials. These materials may be used in various combinations such as combining a cast or forged steel inner spoked shroud with aluminum blades and a plastic outer rim. Such a construction advantageously provides for low effective weight and ensurs a low moment of inertia to facilitate quick response to changes in fluid flow velocity where the reaction member is used as a free-wheeling unit.

By constructing the reaction member in accordance with the present invention, several other difficulties created by conventionally casting the reactor member as one-piece are overcome. Due to the complex curvature of the blades, smooth surfaces which contribute to efficient transmission of power cannot be economically obtained with one-piece castings and because of the complex shape of the resultant casting, the problem of cleaning out the imperfections formed during the casting operation is rendered more difficult. In die casting the reactor blades, at least two molds of dies are required, one to form the exterior and the other to form the interior of the blades, and in view of the number of dies required, the resultant manufacturing cost is usually prohibitive.

As a consequence, previous methods involving the casting of hydrodynamic reaction members have been characterized by high-cost time-consuming operations which are not readily incorporated into overall mass production methods. Thus, the various known casting methods usually have been found to be economically unacceptable.

Another widely used prior art method for producing hydrodynamic reaction members involves the separate fabrication of the blades which are fixedly secured to a stamped or forged inner support shroud or to the outer support shroud, or, in some cases, to both shrouds. The blades are suitably fastened by means of tabs usually formed integral with each blade and by bending the tabs over to lockingly fit into slots formed in either the inner or outer support shrouds. Such tabbed blades are generally fabricated from sheet metal to readily enable the tabs to be bent and fitted into their respective securing slots in locking position.

While these tabbed sheet metal blades are generally economical to fabricate and are desirably of light weight, several difficulties have been encountered with such constructions to offset the advantages of light weight in low manufacturing cost. To this end, it will be appreciated that due to the inherent flexibility of the sheet metal, the blades can be easily distorted during assembly, especially when the tabs are bent over and lockingly secured to the inner or outer support shrouds. As a consequence, the blade curvature is changed to correspondingly affect the torque multiplying characteristics or the torque transferring characteristics of the hydrodynamic drive and thereby diminish the efficiency of the drive. Also, considerable difficulty has been experienced with such tabbed blade constructions in accurately setting and positioning the blades in their proper relative positions during assembly.

Furthermore, in operation of a hydrodynamic device embodying such a reactor tabbed blade construction, it has been found that the blades often work loose as a result of the impact of fluid passing through the blades.

From the above considerations, it is apparent that, heretofore, there has been no satisfactory bladed reactor wheel constructions for hydrodynamic drive in general use which are simple and economical to make and to assemble, and which, and at the same time, provided for a rigid vibration proof bladed wheel structure.

Accordingly, the present invention further contemplates a hydrodynamic bladed reactor wheel of the free-wheeling or stationary type which is of improved construction and which satisfies these foregoing requirements and which is readily made and assembled by mass production methods. By fabricating the bladed reactor according to the present invention the advantages of casting methods and tabbed blade constructions are attained with none of the principle disadvantages attributable to each of these prior methods.

Accordingly, it is one of the primary objects of the present invention to provide for a novel hydrodynamic bladed reactor wheel in which separately formed blades are mounted on spokes integrally radiating from a central hub section of an inner support shroud after the hub section has been machined and hardened to accommodate the sprags of a one-way clutch for allowing rotation of the reactor wheel or has been machined and hardened to form splines or a key-way to fix the reactor wheel against rotation.

A further principal object of the present invention is to provide for a novel hydrodynamic bladed reactor wheel in which separately formed blades are mounted on radially extending spokes formed integral with a hollow hub section of an inner blade support shroud and in which the outer shroud is then fixed to the spokes of the blades by mechanical means or by casting the outer shroud around the sub-assembly of the blades and the inner shroud to interlock with the inner shroud and with the blades.

A more specific object of the present invention is to provide for a novel hydrodynamic bladed reactor wheel construction having separately formed hollow blades slidably mounted in oriented position on spokes formed rigid with a hub section of an inner blade support shroud after the bore of the hub section has been machined and hardened and wherein the outer blade support shroud is then applied to secure the blades in place.

A further object of the present invention is to provide for a novel hydrodynamic bladed reactor wheel construction as in the preceding object wherein the inner shroud is made up of two separately formed axially adjacent segments.

Still another object of the present invention is to provide for a hydrodynamic bladed reactor wheel construction as in the preceding object wherein each of the adjacent segments of the inner shroud are provided with spokes such that each blade is mounted on a pair of axially spaced apart spokes.

Another object of the present invention is to provide a novel bladed reactor wheel construction as in the preceding object wherein the spokes of the adjacent members extend completely through the blades associated therewith and through the outer blade support shroud such that the blades are non-interlockingly fixed between the inner and outer support shrouds.

Still a further object of the present invention is to provide a novel hydrodynamic bladed reactor wheel construction which has low effective weight of the rotating parts to minimize mechanical friction and to ensure a low moment of inertia of the rotating parts thereby providing for a quick response to a change in fluid flow through the blades.

Another object of the present invention is to provide for a novel hydrodynamic bladed reactor wheel construction which has simplicity of construction and which has a low manufacturing cost.

Still a further object of the present invention is to provide for a novel hydrodynamic bladed reactor wheel construction having separately fabricated component parts which are easily and readily assembled.

Further objects of the invention will appear as the description proceeds in connection with the appended claims and the annexed drawings herein:

FIGURE 1 is a section through a hydraulic torque converter having a bladed reactor member according to one embodiment of the present invention;

FIGURE 2 is a front elevational view of the bladed reactor member shown in FIGURE 1;

FIGURE 3 is a rear elevational view of the bladed reactor member shown in FIGURE 1;

FIGURE 4 is a section taken substantially along lines 4—4 of FIGURE 3;

FIGURE 5 is an enlarged partially sectioned front elevational view of a bladed reactor member according to a further embodiment of the invention wherein the blades are partly assembled on the inner blade support shroud;

FIGURE 6 is an enlarged section taken along line 6—6 of FIGURE 5;

FIGURE 7 is a developed plan view taken substantially along line 7—7 of FIGURE 6;

FIGURE 12 is a fragmentary radially sectioned view of a bladed reactor member according to a further embodiment of the present invention;

FIGURE 13 is a section taken along lines 13—13 of FIGURE 12;

FIGURE 14 is a fragmentary radially sectioned view of a bladed reactor member according to a further embodiment of the present invention;

FIGURE 15 is a fragmentary radially sectioned view of a bladed reactor member according to still another embodiment of the present invention;

FIGURE 15a is a fragmentary left-hand elevational view of the bladed reactor member in FIGURE 15 and taken substantially along lines 15a—15a;

FIGURE 16 is a radially sectioned view of a bladed reactor member according to still another embodiment of the present invention;

FIGURE 16a is a generally perspective view showing the method of fabricating one of the component parts of the embodiment illustrated in FIGURE 16;

FIGURE 17 is a partial fragmentary radially sectioned view of a bladed reactor member according to another embodiment of the present invention;

Figure 9:
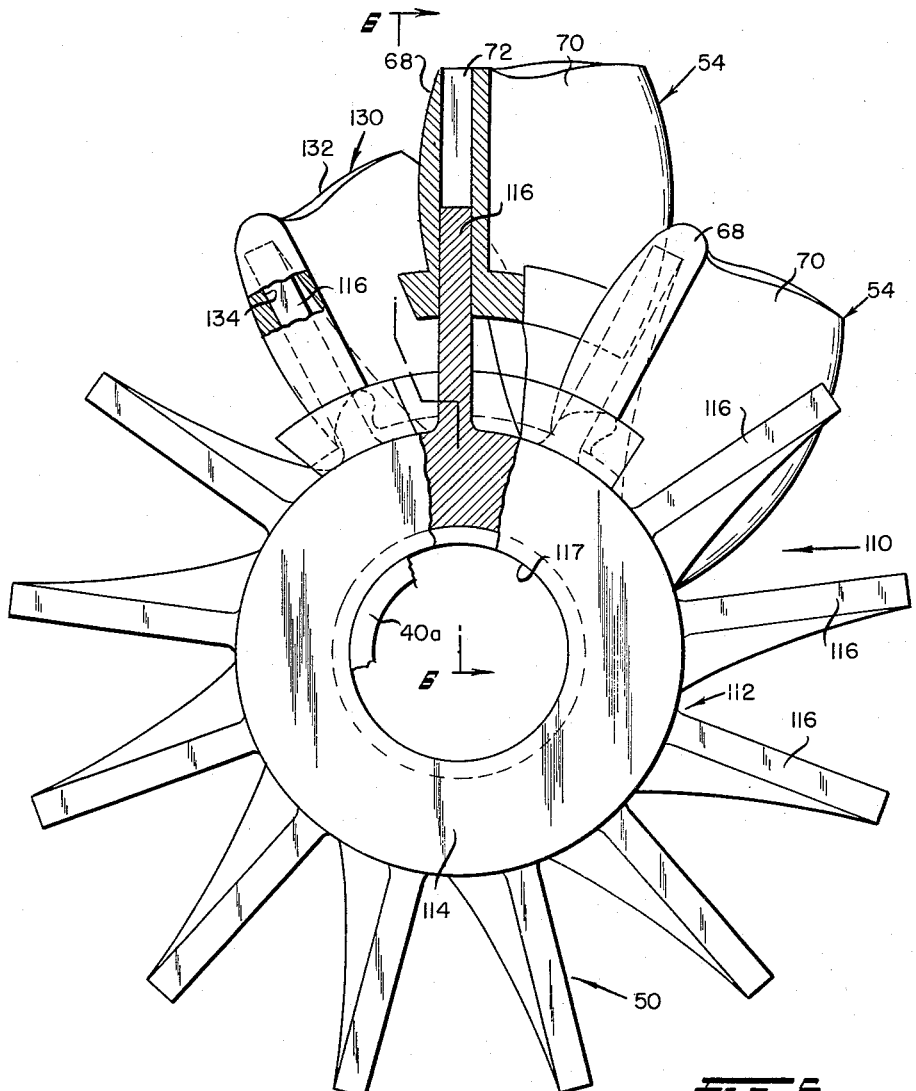
FIGURE 9 is a radially sectioned view of a bladed reactor member according to still another embodiment of the present invention.

Referring now to the drawings and more particularly to FIGURE 1, showing the construction of the bladed reactor member according to one preferred embodiment of the present invention, the reference numeral 20 designates a torque converter which comprises a pump or impeller 22 disposed in a toroidal fluid passageway 24. Passageway 24 is generally formed by a central inner core assembly 26 and an outer casing assembly 28. Driven by the energy produced by pump 22 is a bladed turbine 30 having its blades mounted in passageway 24 adjacent to pump 22. Between pump 22 and turbine 30 and having its blades disposed in passageway 24 is a specially constructed bladed reaction member 34, which in this embodiment, is shown to be mounted for free-wheeling rotation on a special one-way clutch unit 36 drivingly connected to allow rotation of reaction member 34 only in the same direction as that of turbine 30.

Clutch unit 36 is supported on a stationary sleeve 40 which surrounds a journalled drive shaft 42 and which is fixedly secured as by screws 43 to a transmission housing 44 in which converter 20 is enclosed. Shaft 42 extends through sleeve 40 and is splined at 45 to pump 22 to transmit driving torque from an engine output shaft (not shown) to the pump. Turbine 30 is provided with a flange section 46 which is formed rigid with an output sleeve shaft 47 journalled on shaft 42 by a sleeve 48 to thereby deliver to shaft 47 the power transmitted to turbine 30 by pump 22. Shaft 42 is advantageously journalled in an axially fixed conventional ball bearing assembly 49 which has its outer race mounted in a recess formed by housing 44.

With reference now to FIGURES 2–4, one embodiment of member 34 according to the present invention is shown to comprise an inner blade support shroud 50, an outer blade support shroud 52 spaced concentrically apart from shroud 50 and a set of curved blades 54 fixedly secured between inner shroud 50 and outer shroud 52.

With continued reference to FIGURES 2–4, inner shroud 50 is formed with a hub section 56 having a smooth cylindrically shaped outer periphery 58 from which a series of equiangularly spaced spokes 60 radially and integrally extend. As best seen from FIGURE 4, spokes 60 are tapered and are axially centered on hub 56 between the planar end faces 62 and 64 of the hub.

As shown in FIGURE 2, blades 54 correspond in number to spokes 60 and are slidably mounted thereon with the spokes extending only part way through the blades. Each blade 54 is of hollow three-dimensional construction having a blunt rounded leading edge 68 and a generally sharp flat sided trailing edge 70, the plane surface of the trailing edge being turned or twisted relative to the surface to the leading edge in the manner shown in FIGURE 7. The interior surfaces of each blade 54 as formed by an aperture 72 are tapered to correspond to and snugly interfit with the exterior tapered surfaces of spokes 60 such that in mounting the blades on spokes 60, the blades are snugly positioned on shroud 50.

Blades 54 may be fabricated from sheet metal or may be cast with the hollowed form from suitable lightweight materials such as aluminum, magnesium or thermoplastics.

As best shown in FIGURES 1, 4, 5 and 7 each blade 54 is formed with an integral dish-shaped base segment 74 which has a smooth cylindrically shaped inner periphery adapted to interfit with the peripheral surface 58 of hub section 56. As best seen from FIGURE 7, each base segment 74 is advantageously formed with circumferential offset end portions interconnected by a diagonally extending intermediate portion to thereby form a generally Z-shaped base. The axial ends of each base segment 74 are curved radially outwardly from the center of hub 56 to provide for the desired contour of passageway 24, as best shown in FIGURE 1. The base section 74 of each blade 54 is adapted to interfit with the base section on each of the adjacent blades to form a continuous smooth surface as best seen from FIGURE 7.

With continued reference now to FIGURES 1–4, the tips of blades 54 are formed with circumferentially extending furrows 76 providing a concave outwardly opening surface which interfits with the contour of a continuous rim section 78 of outer shroud 52. Shroud 52 is shown in FIGURES 1–4 to be cast in place allowing the casting metal to flow into the hollow interior 72 and into the furrows 76 of blades 54 for fixedly securing blades 54 on spokes 60 and to thereby provide for a rigid and unitary tightly interlocked assembly of shrouds 50 and 52 with fixed blades 54. The outer periphery of rim section 78 is cylindrically shaped.

With continuing reference to FIGURES 1–4, hub section 56 is provided with an axial stepped bore 80 having a forward reduced bore portion 82, an intermediate bore portion 84 having a larger diameter than bore portion 82, and a rearward bore portion 86 having a larger diameter than bore portion 84. The bore portion 84 receives the one-way clutch unit 36 which is of conventional construction except that the outer race has been omitted.

The clutch 36 is advantageously of the sprag type which includes a multiplicity of closely associated sprags 90 (FIGURE 2), all of which are slightly cocked in the same direction relative to a radial line extending through each individual sprag. Sprags 90 are yieldably acted upon by a pair of axially spaced apart circumferentially coiled springs 92 and are positioned in bore portion 84 between the smoothly formed wall of hub 56 and the outer periphery of sleeve 40, as best shown in FIGURE 1, such that the outer and inner cylindrically shaped smooth surfaces of sleeves 40 and hub 56 cooperate with and engage sprags 90. Such one-way drive coupling is generally well known and it is understood that shroud 50 is free to rotate in the direction indicated by the arrow in FIGURE 2 but cannot rotate in the opposite direction as the slightly cocked sprags 90 tend to straighten up to a radial position and establish a wedging or binding action thereby permitting free-wheeling rotation of reactor member 34 only in one predetermined direction.

Clutch unit 36 is restrained against axial movement between an annular shoulder 94 formed by bore portions 82 and 84 and a retainer 96. Retainer 96 is firmly axially held in abutment with an annular shoulder formed between bore portions 84 and 86 by the outer race of a conventional ball bearing assembly 98. The outer race of bearing assembly 98 is axially restrained against movement between retainer ring 96 and annular retainer 100 which is seated in an annular groove formed in the inner periphery of hub 56. The inner race of bearing assembly 98 is held against axial displacement between a shoulder 102 formed on sleeve 40 and an annular retainer 104 which is seated in an annular groove formed in the outer periphery of sleeve 40 as shown in FIGURE 1.

In the assembly of the inner and outer shroud and blade components of reactor member 34, shroud 50 is first formed by casting, forging or other suitable fabrication as one piece. Bore 80 then is usually machined to provide the smooth cylindrical surface at 84 for engaging clutch sprags 90 and the inner shroud is then pre-hardened by conventional heat treating methods before the blades 54 are assembled on spokes 60.

By hardening shroud 50, according to conventional methods, it is understood that the hardness is obtained by heating shroud 50 to a temperature within or above its critical range and then cooling it rapidly. The proper temperature to heat shroud 50 is determined by the constituents of the metal as is well known in the art. Where steel is used to fabricate shroud 50, the proper heating temperature is determined by an iron-carbon equilibrium diagram. The rate at which shroud 50 is heated to its hardening temperature depends primarily upon the particular size of the shroud and it will be understood that the heavier the section, the longer must be the heating time to achieve uniform results.

The hardness obtained by the heat treatment depends upon the quenching rate, the carbon content and the work size, and these factors may be readily controlled by those skilled in the art to achieve the desired degree of hardness.

The hollowed out blades 54 which may be made by casting, forging or sheet metal fabrication are thereafter mounted one on each of the spokes 60 in a properly orientated position for providing a desired direction of fluid flow through passageway 24. The engaging surfaces on blades 54 and inner shroud 50 serve to properly orientate the blades in position as they are slidably mounted over their respective spokes 60.

The sub-assembly of the blades and inner shroud is then placed in a core box. A core of sand, plaster or other material in the core box interfits into the spaces between the blades 54 and inner shroud 50 in the core box and is shaped to provide the mold for outer shroud 52. The blade and inner shroud sub-assembly fitted into the core then is placed in a mold and the outer shroud 52 is then cast in place by allowing a casting material to flow into the hollow interior 72 of blades 54 through the top openings in the tips thereof and into the blade tip furrows 76 to thereby form a continuous outer shroud of generally T-shaped cross section which interlocks blades 54 with shroud 50 as a unit to provide a rigid shock and rattle proof unitary bladed hydrodynamic wheel structure.

It will be appreciated that in contrast to prior commercially practical constructions, the hub 56 of shroud 50 is conditioned to have its inner peripheral surfaces formed by bore 84 to be in direct surface engagement with sprags 90 thereby eliminating the necessity of having a separate outer race which is machined and pre-hardened to be highly resistant to cutting action and abrasion and to thereby assure the prolonged operation of the assembly without causing the sprag engaging surfaces of hub 56 to be galled during the operating period. Thus, for the same size torque converter, the present invention enables the insertion of a one-way clutch having a greater capacity, and more particularly having sprags which are increased in size by a magnitude corresponding to the space heretofore taken up by a separate outer race.

It will be appreciated that the omission of the separate outer clutch race is facilitated by forming the inner shroud to condition the hub of the shroud to engage the clutch sprags with a surface contact before the blades are mounted in the assembly. This eliminates the problem of blade distortion that would otherwise be present if the entire assembly of the reactor member 34 were heat treated to obtain the necessary hardness of the hub surfaces in contact with the clutch sprags.

FIGURES 5-7 illustrate a further embodiment of the present invention and shows a reactor member 110 which has a hub of modified construction to enable reactor member 110 to be fixed against rotation and to thereby facilitate its use as a stator in the torque converter assembly such as that shown in FIGURE 1. The same reference numerals used in the embodiment of FIGURES 1-4 are employed to identify identical parts in the embodiments of FIGURES 5-19.

With continuing reference to FIGURES 5 and 6, reactor member 110 is shown to comprise a special inner blade supporting shroud 112 having a hub section 114 and a series of equiangularly spaced spokes 116 radially extending from hub 114 and formed integral therewith. Spokes 116 are tapered and extend from a smooth cylindrically shaped periphery formed by hub 114. Hub 114 is formed with a bore 117 having a longitudinally extending key-way groove 118 which receives an elongated key 119 mounted in a slot formed in the outer periphery of a rigidly fixed sleeve 40a corresponding to sleeve 40 in torque converter 20 of the embodiment illustrated in FIGURES 1-4. Sleeve 40a is adapted to be mounted in surrounding relationship to the input shaft 42 of torque converter 20. By this construction, reactor member 110 is held against rotation and acts as a stator in torque converter 20.

In the assembly of the shroud and blade components of reactor member 110, inner shroud 112 is first separately formed by casting, forging or other fabrication in one piece. Prior to assembly of the blades and the outer shroud, the bore 117 formed by hub 114 is machined for receiving key 119 and the shroud is then subjected to heat treatment to attain the necessary hardness of the inner peripheral hub surfaces forming bore 117. After shroud 110 is machined and hardened, blades 54 are then mounted on spokes 116 as hereinbefore described. The outer blades support shroud in the form of a continuous rim is thereafter attached in the manner described in the embodiment of FIGURES 1-4 or by means as will be explained hereinafter.

With this construction, it will be appreciated that by pre-hardening the inner shroud 112, the necessity of employing separate splined or key-wayed hubs or sleeves of appropriate hardness is eliminated. Since the shroud 112 is formed separately of the blades 54 and is heat treated to attain the requisite degree of hardness for forming a key-way or splines before the blades are mounted on spokes 116, the problem of blade distortion encountered in heat treating an assembly having its blades already mounted is obviated. Consequently, the hub section 114 according to the present invention may be key-wayed or splined and hardened to provide for sufficient rigidity of the material to withstand the forces attributable to fluid flow in toroidal passageway 24 tending to rotate member 110.

Figure 8:
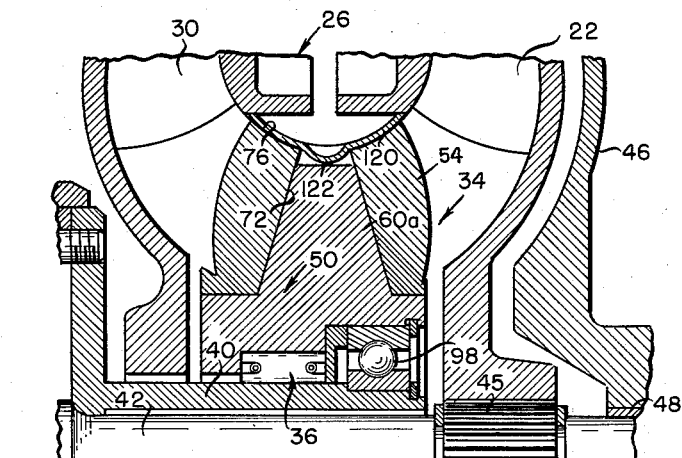
FIGURE 8 is a fragmentary section similar to FIGURE 1 and taken through a hydraulic torque converter having a bladed reactor member according to a further embodiment of the present invention.

FIGURE 8 illustrates a variation of the outer blade support shroud construction for the reactor members in the embodiments of FIGURES 1-7. As shown, blades 54 are fixedly secured in position on inner shroud 50 by means of a continuous outer rim 120. Rim 120 is preferably made from a sheet metal ring which is concavely curved inwardly to interfit with the radially outwardly facing surfaces of blade furrows 76.

Inner shroud 50 is fabricated in the same manner as described in the previous embodiments and blades 54 are thereafter mounted on spokes 60a. Outer rim 120 then is mounted on the sub-assembly of the blades and the inner shroud and is secured in place by dimpling the rim as indicated at 122 such that a portion of the rim is bent radially inwardly to protrude into the hollow interior 72 of each of the blades 54. Spokes 60a are somewhat longer than spokes 60 of FIGURE 1 so that the dimpled portions 122 are in abutting surface contact with the ends of the spokes. By this construction, blades 54 are fixed in position on inner shroud 50 and are firmly interlocked with shroud 50 by outer rim 120.

In the embodiment shown in FIGURE 9, the outer rim 120 is shown to be welded or brazed to the interior wall surfaces 125 of blades 54, as indicated at 126, where the rim fits over the opening to the hollow interior of the blades. In this embodiment, a radial extending space is left between the rim 120 and spokes 60.

Figure 10:
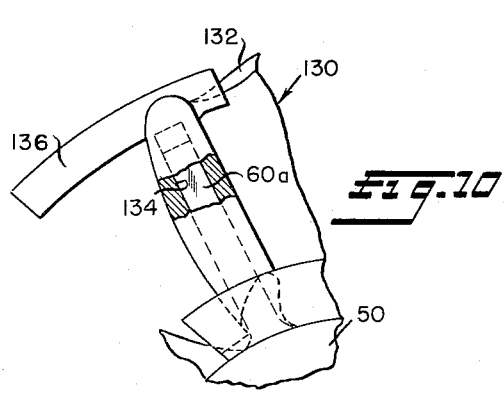
FIGURE 10 is a partially sectioned fragmentary elevation of a bladed reactor member according to another embodiment of the present invention.

In the embodiment shown in FIGURE 10, blade units 130 are shown to be mounted on each of the inner shroud spokes 60a. Each unit 130 comprises a blade 132 having a construction which is essentially the same as that of blades 54 as hereinbefore described and is opened at the bottom in communication with a hollow interior 134 such that the blades 132 sit over spokes 60a in interfitting surrounding relationship therewith. Each blade unit 130 is formed with an integral outer rim segment 136. In the assembly of the component parts shown in FIGURE 10, the inner shroud 50 is fabricated as hereinbefore described in the embodiments of FIGURES 1–7. Blade units 130 are separately formed, each having a blade portion 132 and an outer ring segment 136. Blade units 130 may be conveniently individually cast and then assembled one on each of spokes 60a. Outer ring segments 136 are shaped to abuttingly interfit with each circumferentially adjacent segment to form a continuous rim and the adjacent ring segments are suitably brazed or welded together to form a rigid structure interlocking blade units 130 on inner shroud 50. Also, the blades and outer rim may be cast simultaneously around the spokes of inner shroud 50 in a mold.

Figure 11:
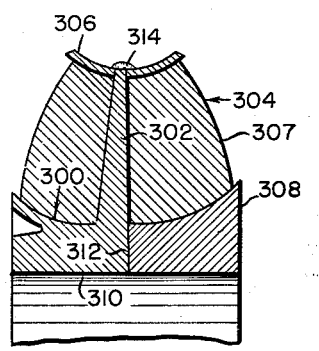
FIGURE 11 is a fragmentary radially sectioned view of a bladed reactor member according to still another embodiment of the present invention.

FIGURE 11 illustrates a further embodiment of the present invention wherein the inner shroud construction is the same as that shown in the embodiment of FIGURES 1–4 except that the radiating spokes are omitted. As shown, the reactor member comprises a hub 140 which is step-bored to receive clutch unit 36 in the same manner as described in the embodiment of FIGURE 1, and has a smooth outer cylindrically shaped periphery 142. A set of blades 144 which are essentially of the same construction as blades 54 are mounted in a circumferential row around the outer periphery of hub 140. Securing blades 144 to hub 140 is a continuous outer rim 146 which is preferably made of sheet metal and which is curved to interfit with concave shaped furrows 148 formed in the tips of blades 144. Each blade 144 is clamped rigidly between rim 146 and hub 140 by means of a screw pin 150 having an enlarged head 152 protruding radially beyond and in abutment with rim 146, a smooth intermediate shank section 153 extending through rim 148 and the hollow interior of blades 144, and a terminal threaded end 156 which is threadedly received in a tapped bore formed radially inwardly of the hub periphery 142.

In the assembly of the component parts of the reactor member shown in FIGURE 11, hub 140 is fabricated in the same manner as described in the embodiments of FIGURES 1–7. Blades 144 and outer rim 146 are thereafter rigidly mounted on hub 140 by means of the screw pins 150 to provide a rigid structure with blades 144 clamped securely between hub 140 and outer rim 146.

FIGURES 12 and 13 illustrate a further embodiment of the present invention wherein the inner shroud construction of the reactor member comprises a pair of separately formed hub sections 160 and 162 of corresponding but axially opposite shape. Hub sections 160 and 162 respectively are formed with equal diameter bores 164 and 166 for receiving sleeve 40 of FIGURE 1 or sleeve 40a of FIGURE 6 and are advantageously of the same axial length. Hub section 160 is provided with smooth planar end faces 168 and 170 contained in planes extending perpendicular to the hub axis and has an outer periphery 172 which curves radially outwardly extending away from end face 170.

Hub section 162 is shaped similar to hub section 160 and has smooth planar end faces 174 and 176 which are contained in planes extending perpendicular to the axis of the assembly. The exterior periphery 178 of hub section 162 is curved radially outwardly extending away from end face 174.

Hub sections 160 and 162 are axially separated by means of an annular flat sided plate 180 which abuts end faces 170 and 174 and which is welded or brazed to hub sections 160 and 162 to provide a unitary rigid inner blade support shroud structure. Plate 180 extends radially inwardly beyond the inner periphery of hub sections 160 and 162 to provide an annular shoulder 182 which may be used for mounting clutch unit 36.

As best shown in FIGURE 13, plate 180 is formed with a series of equiangularly spaced apart radially outwardly extending spokes 184 and the outer peripheral surface of plate 180 extending between spokes 184 is shaped so that in the assembly of plate 180 with hub sections 160 and 162, a peripheral blade support surface is formed which is generally dish-shaped to form a segmental portion of passageway 24 in a manner similar to that shown in the embodiment of FIGURE 1.

Mounted on each of the spokes 184 is a hollowed three-dimensional blade 186. Each blade 186 is similar in shape to blades 54 and has a blunt rounded leading edge 188 and a flat sided trailing edge 190 which is turned or twisted relative to the surface of the leading edge. The portion of blade 186 adjacent leading edge 188 is hollowed out and is open at both ends of the blade. The inner surface 192 of each blade is formed to interfit with the contour of hub surfaces 172 and 178 and the outer tip of each blade is formed with a circumferentially extending furrow 194.

Spokes 184 extend through the bottom opening of blades 186 in interfitting relationship with interior walls 195 formed by the hollowed out blade portions. The upper portion of walls 195 converges slightly so that the outer blade opening is of slightly lesser magnitude then the bottom blade opening, as best shown in FIGURE 13. Fixedly securing blades 186 on the inner shroud construction is a continuous outer rim 196 which is shown to be attached to blades 186 by casting a material which fills furrows 194 and flows into the hollow interior of the blades. The outer periphery of rim 196 is advantageously smooth and cylindrically shaped.

In the assembly of the component hub, rim and blade parts of the reactor member shown in FIGURES 12 and 13, the inner hub sections 160 and 162 and the intermediate spoked plate 180 are separately formed by casting or forging and are hardened and machined prior to assembly of the blades. After the machining and heat treatment of the inner shroud construction to attain the requisite hardness of the hub sections to facilitate the mounting of clutch 36 without a separate outer race as described in the embodiments of FIGURES 1–4, blades 186 then are mounted on the assembly of hub sections 160 and 162 and spoked plate 180 in the manner shown. The outer rim then is attached by casting in a manner described in connection with the embodiment illustrated in FIGURES 1–4. As shown, the molten metal forming the outer rim 196 flows through the top opening of each blade 186 and into the hollow interior thereof so as to form a rigid unitary structure with the blades securely fixed between outer rim 196 and the inner blade support shroud construction formed by hub sections 160 and 162.

FIGURE 14 illustrates a further embodiment of the present invention wherein a modified inner shroud construction of the reactor member comprises a pair of axially adjacent hub sections 200 and 202. Section 200 is formed with a smooth walled bore 204 and with smooth planar end faces 206 and 208 which are contained in planes extending perpendicular to the hub axis. Extending radially from the smooth outer periphery of hub section 200 are a set of equiangularly spaced spokes 210 which are axially positioned closer to end face 208 then to end face 206.

Hub section 202 is constructed similar to that of hub section 200 and has a smooth walled bore 212 which is of the same diameter as bore 204 such that, in assembled relationship, the walls of bores 204 and 212 form a continuous smooth annulus for mounting the reactor member on sleeve 40 or sleeve 40a. Hub section 202 is provided with smooth planar end faces 214 and 216 and has a series of equiangularly radially outwardly extending spokes 218 which are axially coincident with spokes 210. Spokes 210 and 218 are respectively spaced from end faces 208 and 214 by equal distances. Hub sections 200 and 202 are rigidly fixed together with end faces 208 and 214 in surface abutment with each other by means of welding or brazing as indicated at 220.

The assembly of the hub, blade and outer rim component parts of the reactor member shown in FIGURE 14 is generally the same as that described in the embodiments of FIGURES 12 and 13. Both hub sections 200 and 202 are separately formed, machined and hardened as hereinbefore described. A set of blades 222 substantially of the same construction as blades 54 are slidably mounted on spokes 210 and 218 after hub sections 200 and 202 are hardened and welded together in the manner shown. An outer rim 224 is then attached to blades 222 by casting in the same manner as described in the embodiment of FIGURES 12 and 13.

Blades 222 are slidably mounted on spokes 210 and 218 such that each blade 222 receives two spokes. Spokes 210 and 218 are interfittingly received through the bottom openings of blades 222 and extend into the hollow interior thereof so as to properly position and orient the blades in the assembly on hub sections 200 and 202. The inner shroud and blade sub-assembly is then properly oriented in place in a core box wherein a core of suitable configuration holds blades 222 in place as hereinbefore described. The core is then removed to a mold where the outer rim 224 is cast in place to fixedly secure blades 222 in place on hub sections 200 and 202 by allowing the casting material to flow into the hollow interior of the blades 222 through the top openings in the tips thereof.

FIGURES 15 and 15a illustrate another embodiment of the present invention wherein a modified inner shroud construction comprises a one-piece annular ring 230 having cylindrically smooth inner and outer peripheries 232 and 234 extending between smooth planar end faces 236 and 238. Extending radially outwardly and formed integral with ring 230 adjacent the each end face 236 and 238 are a series of axially coincident equiangularly spaced apart tangs 240 and 242 corresponding in number, two for each blade to be mounted on ring 230. Tangs 240 and 242 are bent to extend radially outwardly to the positions shown from axially extending positions indicated by the dotted lines at 244 so as to position and hold the blades of the assembly on ring 230.

In the assembly of the component parts shown in the embodiment of FIGURES 15 and 15a, ring 230 is separately formed as one-piece and is hardened and machined prior to the assembly of the blades as hereinbefore described. Three dimensional hollowed blades 246 having a base section 247 and constructed essentially the same as blades 54 in the embodiment of FIGURES 1–4, then are mounted on ring 230 after it has been hardened and machined. Blades 246 are then secured in their oriented position on ring 230 by bending tangs 240 and 242 from their axially extending positions to their radially extending positions as shown in FIGURES 15 and 15a. Tangs 240 and 242 are received in axially opposed recesses formed in the base 247 of each blade 246.

The blades and inner shroud sub-assembly is, as hereinbefore described, then placed in a core box having a core to hold the blades 246 in their oriented positions. The outer rim 248 then is cast as hereinbefore described in the embodiments of FIGURES 12–14 to interlock blades 246 on ring 230.

FIGURES 16 and 16a illustrate a further embodiment of the present invention wherein a modified inner shroud construction of the reactor member comprises a pair of axially adjacent one-piece sections 260 and 262. Section 260 is formed with a radially extending annular flat sided plate portion 264 and an axially extending skirt portion 266 which is curved radially outwardly to form a segmental portion of the outer wall defining the passageway 24 in the assembly of the reactor member in torque converter 20.

Section 260 is fixedly secured to section 262 as by welding, with plate portion 264 in abutment with the left-hand planar end face of section 262 as viewed from FIGURE 16.

Section 262 is formed with a generally elongated axially extending body portion 268 having a smooth cylindrically shaped inner annulus 270. Depending radially inwardly from the inner annulus 270 of section 262 is an annular flat sided end portion 272 which forms with plate portion 264 an inwardly opening annular recess receiving one-way clutch unit 36 for mounting the reactor member on sleeve 40 as hereinbefore described.

Section 262 is formed with an axially extending annular slot 274 which extends axially inwardly from the right-hand planar end face of section 262 as viewed from FIGURE 16. Slot 274 is formed by an annular lip 276 which is shown to be bent radially outwardly in the assembly to form with skirt 266 a segmental portion of the wall surface defining passageway 24 of torque converter 20.

Adjacent to its left-hand end face, section 262 is provided with a series of equiangularly spaced radially outwardly extending spokes 278 which slidably mount a corresponding number of reactor blades 280 which are of substantially the same construction as blades 186 described in the embodiment of FIGURES 12 and 13. An outer rim 282 is attached to blades 280 by casting in the same manner as described in the embodiment of FIGURES 12 and 13.

In the assembly of component parts of the reactor member shown in FIGURES 16 and 16a, sections 260 and 262 are first separately formed as by forging or casting. As indicated by the dotted lines 284 in FIGURE 16a, lip 276 is cast or forged to extend parallel to the hub axis.

Section 262 then is machined and hardened to facilitate the mounting of clutch unit 36 as hereinbefore described. The two sections 260 and 262 then are welded together and blades 280 are slidably mounted on spokes 278 which interfittingly extend into the hollow interior of the blades through the bottom openings thereof, so as to hold the blades in their properly oriented positions on the inner shroud construction formed by sections 260 and 262. Lip 276 is then flared from the axially extending position indicated at 284 in FIGURE 16a to its full line position for engaging and interfitting with the contour of the bottom surfaces of blades 280.

Lip 276 is flared by means of a tool 288 shown in FIGURE 16a which comprises an elongated flaring portion 290 extending perpendicularly away from an enlarged handle portion 292. The tool flaring portion 290 has a blunt-nosed end 291 which slidably interfits in slot 274 and an enlarged shank section 292. Extending rearwardly from the blunt-nosed end 291, shank 292 is provided with an outwardly facing concavely curved surface 294 such that when the tool portion 290 is inserted into slot 274, the lip 276 is forced radially outwardly to conform to the curvature of surface 294.

After blades 280 are assembled on spokes 278 and lip 276 is flared to interfittingly engage with the bottom of blades 280, outer rim 282 is attached to blade 280 by casting as hereinbefore described.

With reference now to FIGURE 17, a further modified construction of a reactor member is illustrated to comprise a spoked inner support shroud 300 which is the same as the hub section 262 described in the embodiment of FIGURE 16 with the exception that shroud 300 is provided with spokes 302 which are tapered at least along one side and which are elongated to extend completely through a blade unit 304 and an outer blade support rim 306.

Blade unit 304 is formed with a three dimensional hollowed blade portion 307 similar to the construction of blade 54 in FIGURE 1 and with a segmental base section 308. Base 308 has a smooth inner annulus, the diameter of which is the same as the diameter of a central bore 310 formed by inner shroud 300.

By this construction, base 308 forms with shroud 300 a smooth continuous annulus for receiving sleeve 40 of FIGURE 1 or sleeve 40a of FIGURE 6. The outer periphery of the blade bases 308 form with the outer periphery of shroud 300 a generally dish shaped surface which defines a segmental wall surface of the passageway 24 in torque converter 20 of FIGURE 1 in the manner shown.

Base section 308 has a planar end face 312 which interfittingly abuts the right-hand planar end face of shroud 300.

The outer rim 306, which may be fabricated from sheet metal or other suitable materials, is apertured to receive spokes 302 which extend through the hollowed interior of blades 307 and project beyond rim 306. Rim 306 is fixed in place to secure blade unit 304 on spokes 302 by welding or upsetting the ends of spokes 302 which project beyond rim 306 as indicated at 314.

Figure 18:
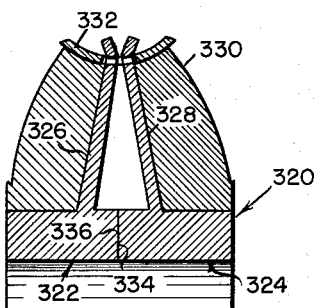
FIGURE 18 is a fragmentary radially sectioned view of a bladed reaction member according to still another embodiment of the present invention.

With reference now to FIGURE 18, a further modified construction of the reactor member is shown to comprise an inner shroud assembly 320 having separate axially adjacent one-piece hub sections 322 and 324. Hub sections 322 and 324 are constructed the same as sections 200 and 202 of FIGURE 14 with the exception that hub sections 322 and 324 are respectively provided with spokes 326 and 328 which are inclined toward each other and which are elongated to extend in pairs completely through each of a set of blades 330 and project beyond an outer continuous rim 332. The construction of blades 330 is essentially the same as blades 222 shown in the embodiment of FIGURE 14.

With continued reference to FIGURE 18, sections 322 and 324 first are separately formed as by casting or forging and are then machined and hardened in a manner as hereinbefore described. Sections 322 and 324 then are welded or brazed together such that their end faces 334 and 336 are in interfitting abutment with each other. After sections 322 and 324 are hardened and secured together, blades 330 are slidably mounted, one on each pair of spokes 326 and 328. The outer rim then is slidably fitted over spokes 326 and 328 such that the spokes project beyond rim 332.

In order to fixedly secure rim 332 to blades 330 and to clamp blades 330 in their oriented position on shroud 320, the tips of spokes 226 and 228 projecting beyond rim 332 are flared or bent over to engage the free periphery of rim 332. With this construction, it will be appreciated that blades 330 are not interlocked with either rim 332 or inner shroud 320. As shown, the inner and outer surfaces of blades 330 are in separable abutting surface contact with rim 332 and inner shroud 320.

Figure 19:
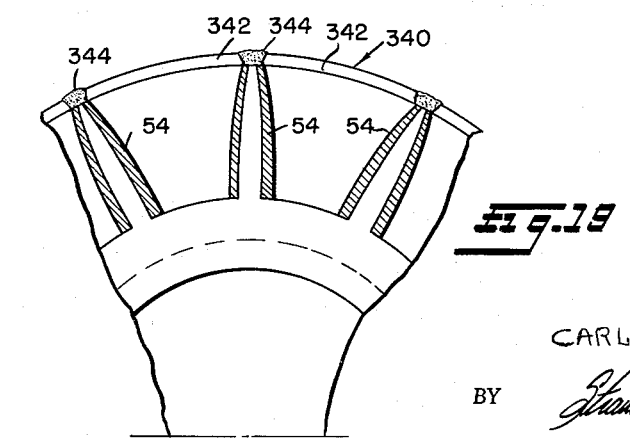
FIGURE 19 is a fragmentary partially sectioned front elevational view of a bladed reactor member according to still another embodiment of the present invention.

In the embodiment shown in FIGURE 19, the construction of the reactor is generally the same as that shown in FIGURE 1 except that a segmentally formed outer rim assembly 340 is provided for. Rim assembly 340 comprises a series of interfitting arcuate segments 342. Each segment 342 spans adjacently disposed blades 54 and is brazed or welded at each end to the tips of the adjacently disposed blades as indicated at 344.

While the foregoing description has been largely concerned with the novel elements of the particular structure, it is obvious that the invention is not necessarily restricted thereto and that functional equivalents may be employed to carry out the method of assembling the component parts of the reactor member in accordance with the aims of the present invention. Thus, in accordance with the present invention, the method of assembling the reactor member shown in FIGURE 1 and in the various other embodiments of FIGURES 5–19, is started by separately forming the inner blade support shroud which is provided with a series of radial spokes which extend from a central hub member and which are adapted to hold the blades in position on the inner shroud. Prior to assembly of the blades, the inner shroud is machined and hardened by conventional heat treating methods to provide the necessary smooth surface and hardness for engaging with splines or keys of the stationary support sleeve 40a, or for receiving one-way clutch unit 36 in operative surface contacting engagement with sprags 90 of the clutch unit.

The blades are preferably separately cast hollow members and are advantageously formed with integral fluid circuit base sections. These blades are slidably mounted on the spokes after the shroud has been pre-hardened and machined. After assembling the blades, the outer rim is then attached by casting. The outer rim may be cast in sections or it may be secured by brazing a prefabricated rim to the blades. Also, the blades and the outer rim may be cast simultaneously around the spoked hub in a mold. The spokes also may extend all the way through the blades to allow attachment of the outer rim to the spokes by brazing or welding or the spokes may extend part way through the blades to allow casting material of the outer rim to flow into the outer section of the blades. The outer rim may also be formed by a sheet metal ring attached to the assembly by dimpling as illustrated in FIGURE 8.

Thus by the foregoing construction and method of assembly, the necessity of providing for an outer race for the one-way clutch in an embodiment where the reactor member is utilized as a free-wheeling rotating member, or for providing separate spline of key-wayed sleeves in an embodiment where the reactor member is utilized as a stator, is eliminated. Further, by means of the foregoing novel fabrication and assembly of parts, a rigid sturdy unit is provided for in which the various component parts may be of different suitable materials such as aluminum, magnesium or thermoplastics as hereinbefore described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a peripherally bladed reactor assembly for a hydrodynamic torque transmitting device having a substantially toroidal liquid circuit therethrough and comprising a stationary mounting sleeve, said bladed reactor assembly comprising separately formed coaxially mounted inner and outer blade support shrouds, a plurality of equiangularly spaced apart spokes rigid with said inner shroud and extending radially therefrom, a plurality of substantially radially extending hollow blades mounted on said spokes in fixed oriented position between said inner and outer shrouds in rigid end abutment with both of said shrouds, said inner shroud having a hollow hub formed with a bore provided with a hardened surface, torque transmitting means interposed directly between said sleeve and said hardened surface, and means integral with the roots of each of said blades defining an outwardly concave fluid circuit directing surface within said device, all of said concave blade surfaces being cooperatively contoured in circuit directing relation to form a substantially continuous smooth portion of said passageway.

2. In the peripherally bladed reactor assembly as defined in claim 1, said outer shroud being a continuous rim engagingly confining said blades in place on said spokes and having portions radially projecting into the interiors of said blades in surface engagement with the tips of said spokes.

3. In the bladed reactor member as defined in claim 1, said outer shroud being a continuous rim surroundingly engaging said blades to secure said blades in place, said spokes extending completely through said blades and beyond said rim, and means securing the outer tips of said spokes to said rim.

4. In the peripherally bladed assembly as defined in claim 1, each said hub being formed with a pair of axially adjacent segments each having a coextensive set of integrally formed equiangularly spaced apart radially extending spokes, said spokes extending in pairs into the interiors of said blades.

5. A bladed wheel assembly for a hydrodynamic torque transmitting device having a passageway defining substantially toroidal liquid circuit therethrough comprising an inner shroud having a hollow hub, means providing a series of rigid outwardly extending spokes on said hub, a hollow blade unit mounted on each spoke, a peripherally continuous outer shroud rigid with the radially outer ends of said hollow blades, said blades being engaged with both said shrouds and continuously rigid between said shrouds, and means integral with the roots of each blade providing an outwardly concave circuit directing surface within said device, all of said surfaces being cooperatively contoured in circuit directing relation to form a substantially continuous smooth portion of said passageway.

6. A bladed wheel assembly for a hydrodynamic torque transmitting device having a passageway defining a substantially toroidal liquid circuit therethrough comprising an inner shroud having a hollow hub, means providing a series of rigid outwardly extending spokes on said hub, a hollow blade unit mounted on each said spoke, a peripherally continuous outer shroud rigid with the radially outer ends of said hollow blades, the opposite ends of said blades engaging the respective shrouds, and means integral with the roots of each of said blades defining an outwardly concave circuit directing surface, all of said surfaces being coopeartively contoured in circuit directing relation to form a substantially continuous smooth portion of said passageway.

References Cited by the Examiner

UNITED STATES PATENTS

| | | | |
|---|---|---|---|
| 1,094,133 | 4/14 | Dianovszky | 253—77 |
| 1,519,417 | 12/24 | Payne | 192—84 |
| 1,720,729 | 7/29 | Hanzlik | 253—77 |
| 1,876,518 | 9/32 | Mathis | 29—156.8 |
| 1,938,382 | 12/33 | Haigh | 253—77 |
| 1,966,104 | 7/34 | Noack | 253—77 |
| 2,061,997 | 11/36 | Dunn | 103—115 |
| 2,293,765 | 8/43 | Salerni | 103—115 |
| 2,336,231 | 12/43 | Dodge | 103—115 |
| 2,347,034 | 4/44 | Doran | 255—77 |
| 2,387,722 | 10/45 | Dodge | 29—156.8 |
| 2,478,306 | 8/49 | Orr | 103—115 |
| 2,494,539 | 1/50 | Bolender | 103—115 |
| 2,660,122 | 11/53 | Landberg | 103—111 |
| 2,690,132 | 9/54 | Misch | 103—115 |
| 2,696,171 | 12/54 | Jandasek et al. | 103—115 |
| 2,727,360 | 12/55 | Kelley | 60—54 |
| 2,733,086 | 1/56 | Latzen | 308—241 |
| 2,755,628 | 6/56 | Mamo | 103—115 |
| 2,786,646 | 3/57 | Grantham | 103—115 |
| 2,858,675 | 11/58 | Schneider | 60—54 |
| 2,925,896 | 2/60 | Jaeschke | 192—21.5 |
| 2,951,398 | 9/60 | Glomb et al. | 60—54 |
| 3,014,430 | 12/61 | Schneider | 103—115 |

FOREIGN PATENTS

| | | |
|---|---|---|
| 527,540 | 7/56 | Canada. |
| 895,885 | 4/44 | France. |

JOSEPH H. BRANSON, Jr., *Primary Examiner.*

JULIUS E. WEST, *Examiner.*